(12) United States Patent
Klok

(10) Patent No.: US 11,149,958 B2
(45) Date of Patent: Oct. 19, 2021

(54) HIGH CAPACITY OVEN

(71) Applicant: Koninklijke Fabriek Inventum B.V., Nieuwegein (NL)

(72) Inventor: Martijn Klok, Boskoop (NL)

(73) Assignee: Koninklijke Fabriek Inventum B.V., Nieuwegein (NL)

( * ) Notice: Subject to any disclaimer, the term of this patent is extended or adjusted under 35 U.S.C. 154(b) by 205 days.

(21) Appl. No.: 16/230,068

(22) Filed: Dec. 21, 2018

(65) Prior Publication Data

US 2020/0200395 A1    Jun. 25, 2020

(51) Int. Cl.

| *F24C 15/16* | (2006.01) |
| *B64D 11/04* | (2006.01) |
| *F24C 7/08* | (2006.01) |
| *F24C 15/00* | (2006.01) |
| *F24C 15/02* | (2006.01) |
| *F24C 15/30* | (2006.01) |
| *F24C 15/34* | (2006.01) |

(52) U.S. Cl.
CPC .............. *F24C 15/16* (2013.01); *B64D 11/04* (2013.01); *F24C 7/085* (2013.01); *F24C 15/006* (2013.01); *F24C 15/024* (2013.01); *F24C 15/30* (2013.01); *F24C 15/34* (2013.01)

(58) Field of Classification Search
CPC ........ F24C 15/16; F24C 7/085; F24C 15/006; F24C 15/024; F24C 15/30; F24C 15/34; B64D 11/04
See application file for complete search history.

(56) References Cited

U.S. PATENT DOCUMENTS

| 4,180,125 | A | * | 12/1979 | Schulz | F25D 23/12 165/48.1 |
| 4,346,756 | A | * | 8/1982 | Dodd | A47J 39/006 126/268 |
| 5,028,761 | A | * | 7/1991 | Oda | A47J 39/006 219/386 |
| 5,403,997 | A | * | 4/1995 | Wimpee | A47J 39/006 219/386 |
| 5,655,595 | A | * | 8/1997 | Westbrooks, Jr. | A47J 39/006 165/48.1 |
| 6,021,709 | A | * | 2/2000 | Koopman | A21B 1/245 126/21 A |
| 6,572,207 | B2 | * | 6/2003 | Hase | A47B 31/02 165/919 |
| 10,137,987 | B2 | * | 11/2018 | Burd | B64D 11/0007 |

(Continued)

*Primary Examiner* — Alfred Basichas
(74) *Attorney, Agent, or Firm* — Suiter Swantz pc llo

(57) ABSTRACT

An apparatus for heating food comprises a high capacity oven configured for receiving and cooking nine vertically spaced meal trays. The increased capacity oven maintains an outer vertical dimension in compliance with standard aircraft oven sizes while increasing the inner oven vertical dimension sufficiently to receive and sufficiently cook the nine meal trays. The increased capacity oven maintains a sufficient vertical spacing between each meal tray to enable sufficient airflow between the meal trays for timely meal cooking. Efficient placement of oven components in each of the areas above and below the oven internal cavity increases the internal vertical dimension of the oven internal cavity and the available vertical cooking space.

7 Claims, 5 Drawing Sheets

(56) References Cited

U.S. PATENT DOCUMENTS

2003/0226657 A1* 12/2003 Wallace ............... F25D 11/003
  165/202
2013/0255662 A1* 10/2013 Schootstra ........... F24C 15/162
  126/340

* cited by examiner

HIGH CAPACITY OVEN

BACKGROUND

Traditional ovens onboard an aircraft may be limited in vertical capacity. A traditional oven may possess a limited vertical dimension in which to cook a stack of multiple trays of meals. Current ovens may be vertically limited to a number of meal trays available to cook at one time.

Aircraft oven specification may fall within oversight by an airworthiness authority or standard configuration and size for simplicity of replacement. An aircraft oven may fall within a category of products labeled "Galley Inserts" (GAIN). Such oversight of GAIN products may require aircraft ovens to maintain a specific and limited external dimension to "fit" (x, y, z) within an allotted space. In addition, such GAIN oversight may mandate a specific power specification and a heat dissipation requirement.

With a limited external dimension as well as function required for safety as well as performance, one challenge may be to find more space within the internal dimension.

Therefore, a need remains for an apparatus creating vertical space to accommodate additional meals and cook more food products at one time.

SUMMARY

In one aspect, embodiments of the inventive concepts disclosed herein are directed to an apparatus for heating food, the apparatus may comprise a high capacity oven having an oven external case, the oven external case maintaining a standard outside vertical dimension. The high capacity oven may be configured for heating of an oven internal cavity to a cooking temperature, the oven internal cavity maintaining an oven internal cavity vertical dimension.

The oven internal cavity vertical dimension may be sized to receive a high capacity meal carrier, the high capacity meal carrier configured to receive at least nine meal trays vertically spaced at a vertical spacing dimension sufficient for cooking. The high capacity oven having vertically arranged components within the oven external case and associated with the heating, each of the vertically arranged components may be arranged within the external vertical dimension. In operation, the high capacity oven is capable of the heating while maintaining a safe temperature within the oven external case.

An additional aspect of the inventive concepts disclosed herein may be directed to a method for vertically configuring a high capacity oven. The method may comprise sizing a vertical dimension of an oven internal cavity to approximately 460 mm, the vertical dimension sufficient to house at least nine meal trays vertically spaced at least approximately 45 to 50 mm apart, the high capacity oven configured to heat the oven internal cavity to a cooking temperature. The method may further include arranging each component of the high capacity oven within an oven external case cavity to accommodate each component. Here, the components may comprise the oven internal cavity surrounded by an insulation, a human machine interface, an oven external case handle, an oven control unit, and an oven cooling fan. To ensure safety, the method maintains a vertical dimension of an upper cavity of the oven external case to accommodate sufficient cooling airflow around the insulation and maintains a sufficient vertical dimension of the insulation.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
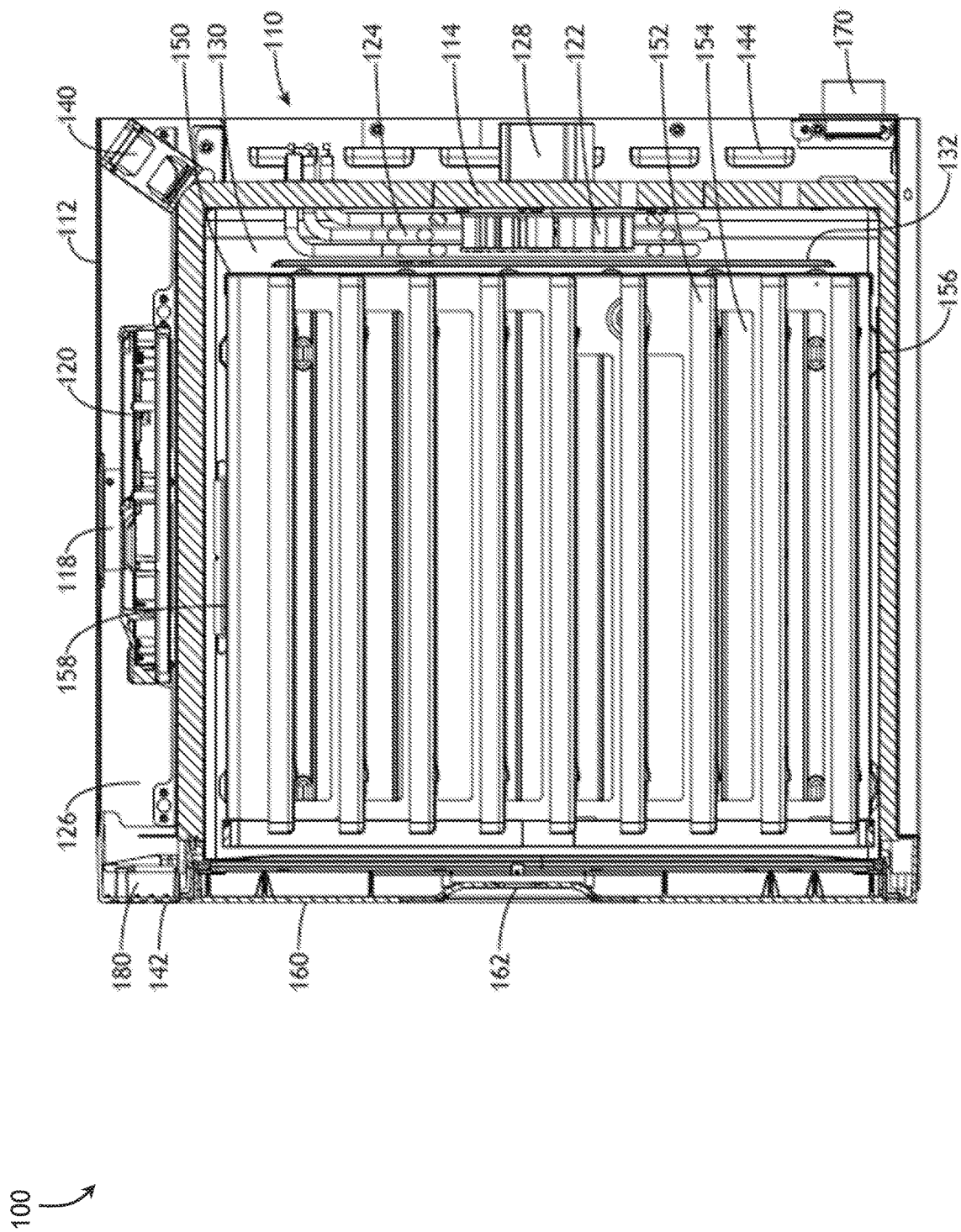
FIG. 1 is a diagram of a side view of a high capacity oven in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to an apparatus for heating food comprises a high capacity oven configured for receiving and cooking nine vertically spaced meal trays. The increased capacity oven maintains an outer vertical dimension in compliance with standard aircraft oven sizes while increasing the inner oven vertical dimension sufficiently to receive and sufficiently cook the nine meal trays. The increased capacity oven maintains a sufficient vertical spacing between each meal tray to enable sufficient airflow between the meal trays for timely meal cooking. Efficient placement of oven components in each of the areas above and below the oven internal cavity increases the internal vertical dimension of the oven internal cavity and the available vertical cooking space.

| | Reference Chart |
|---|---|
| 100 | Side View of High Capacity Oven |
| 110 | High Capacity Oven |
| 112 | Oven External Case |
| 114 | Oven Insulation |
| 118 | Oven External Case Handle |
| 120 | Oven Control Unit (OCU) |
| 122 | Oven Fan |
| 124 | Oven Heating Element |
| 126 | Oven External Case Cavity |
| 128 | Oven Fan Motor |
| 130 | Oven Internal Cavity |
| 132 | Oven Fan Barrier |
| 140 | Cooling Fan |
| 142 | Cooling Air Inlet |
| 144 | Cooling Air Exhaust |
| 150 | High Capacity Meal Carrier |
| 152 | Meal Tray |
| 154 | Meal Tray Bracket |
| 156 | Meal Carrier Support |
| 158 | Meal Carrier Handle |
| 160 | Oven Door |

-continued

| | Reference Chart |
|---|---|
| 162 | Oven Door Handle |
| 170 | Electrical Connection |
| 180 | Human Machine Interface (HMI) |
| 200 | Front View of High Capacity Oven |
| 300 | Front View Door Open |
| 312 | Oven External Case Vertical Dimension |
| 322 | Oven Fan Screen |
| 326 | External Case Upper Cavity Vertical Dimension |
| 328 | External Case Lower Cavity Vertical Dimension |
| 330 | Oven Internal Cavity Vertical Dimension |
| 352 | Meal Tray Spacing |
| 400 | View of Meal Carrier |
| 500 | Method for Vertically Configuring High Capacity Oven |

FIG. 1 Side View

Referring now to FIG. 1, a diagram of a side view of a high capacity oven in accordance with an embodiment of the inventive concepts disclosed herein is shown. View 100 may include a side view 100 of the high capacity oven 110 with internal components displayed.

Within this document, the three axes of an aircraft may be defined as: 1) the longitudinal axis may be considered the axis of the aircraft from nose to tail; 2) the lateral axis may be a wing tip to wing tip axis, and 3) the vertical axis may be considered an up/down axis parallel to a lift vector of the aircraft. Here, an oven may be considered to be mounted facing either forward or aft and oriented along the longitudinal axis of the aircraft. In some instances, it may be prudent and efficient for an operator to mount an oven facing laterally (e.g., facing a wingtip). However, in this document, all references to oven placement are relative to the longitudinal axis of the aircraft (e.g. facing forward or aft).

The word "approximately" in the claim language in referring to ranges of size (dimension) and temperature may be defined to be +/−%5 (five percent) of the referred to measurements. For example, the external vertical dimension of "approximately 563 mm" may be interpreted as a range from 535 to 591 [(563-(%5 of 563))=534.9 to (563+(%5 of 563))=591.1].

In one embodiment of the inventive concepts disclosed herein, the high capacity oven 110 may include an oven external case 112 with associated oven external case handle 118, and oven insulation 114. Between the oven insulation 114 and the oven external case 112, an oven external case cavity 126 may provide an area of sufficient size to support an oven control unit (OCU) 120, an inset for the oven external case handle 118, a cooling fan 140, an oven fan motor 128 where the oven external case cavity 126 also provides ample space for a flow of cooling air around the oven insulation 114.

The high capacity oven 110 may also include an oven door 160 with associated oven door handle 162. Also, on a user side (front) of the oven, and separate from the oven door 160, a human machine interface (HMI) 180 may provide an ability for the user to control the high capacity oven 110. Also, on the user side of the oven, a cooling air inlet 142 may provide an orifice through which cooling air may be pulled into the oven external case cavity 126 via a cooling fan 140. Further, the airflow may exit the high capacity oven 110 via a series of cooling air exhaust along each side.

Associated with a rear face of the high capacity oven 110, an electrical connection 170 may function as a standard sized electrical connection compatibly located with a standard sized GAIN oven opening and GAIN electrical source.

The cooking area of the high capacity oven 110 inside of the insulation 114 layer may include an oven internal cavity 130 providing space for an oven fan 122, an oven fan barrier 132, and an oven heating element 124. Also, the oven internal cavity 130 provides sufficient space for a high capacity meal carrier 150 with associated meal carrier support 156 and meal carrier handle 158. The high capacity meal carrier 150 may be fitted with a plurality of meal tray brackets 154 configured to support an associated plurality of meal trays 152 vertically spaced within the high capacity meal carrier 150.

In one embodiment of the inventive concepts disclosed herein, a dimension of the high capacity oven external case 112 may comply with those dimensions specified within a published aviation standard such as ARINC SPECIFICATION 810-5 dated Nov. 23, 2015. In this publication, a standard has been set for an "ARINC size 2" oven including external dimensions of approximately a longitudinal dimension of 570 mm, a lateral dimension of 287 mm, and, of interest to the inventive concepts disclosed herein, a vertical dimension of 563 mm.

In one embodiment of the inventive concepts disclosed herein, the high capacity oven 110 including the oven external case 112 maintains a maximum vertical external dimension of no greater than 563 mm in compliance with the ARINC 2 size standard. The high capacity oven 110 is configured for heating the oven internal cavity 130 to a cooking temperature of approximately 130-170 degrees C. As the oven internal cavity 130 maintains an oven internal cavity vertical dimension of approximately 460 mm to accommodate the high capacity meal carrier 150, the high capacity oven 110 is configured to receive nine or more vertically spaced meal trays 152 for meal cooking.

The vertical dimension of the oven internal cavity 130 may offer a vertical spacing capable of receiving the high capacity meal carrier 150 as well as a dimension between each meal tray 152 at a sufficient spacing for cooking. In one embodiment, the high capacity oven 110 may provide an oven internal cavity 130 to accommodate nine meal trays vertically spaced 48 mm apart. Sufficient spacing for cooking may include such factors as temperature of the oven internal cavity 130, speed of the airflow within the oven internal cavity 130 created by the oven fan 122, and whether or not moisture is added to the oven internal cavity 130 for efficient cooking.

To create the vertical dimension of the oven internal cavity 130, embodiments of the inventive concepts disclosed herein may arrange the components within the oven external case cavity 126 for efficient placement. In one example, the cooling fan 140 may be positioned within an internal corner of the oven external case cavity 126 to fulfill its airflow function yet require a limited amount of vertical dimension.

In another embodiment of the inventive concepts disclosed herein, the high capacity oven 110 may include the OCU 120 placed proximal with the oven external case handle 118. In this manner, the remaining space may be vertically occupied by the oven internal cavity 130. In another example, a spacing between the oven insulation and a bottom of the oven external case 112 may be limited to approximately 14 mm to accommodate the oven internal cavity 130.

In compliance with an aviation standard such as an ARINC 810 compliant temperature standard, the high capacity oven 110 may be capable of heating the oven internal cavity 130 to a desired cooking temperature while maintaining a safe temperature within the oven external case 112. For example, the high capacity oven 110 may operate to maintain the oven internal cavity 130 to a temperature of approximately 130 to 170 degrees C. while maintaining the temperature within the oven external case cavity 126 to a maximum of approximately 71 degrees C. The cooling fan 140 operates to draw cooling air in to the oven external case cavity 126 through the cooling air inlet 142 and push the cooling air out through the cooling air exhaust 144.

The HMI 180 may function as a source for user control of the high capacity oven 110. In one embodiment of the inventive concepts disclosed herein, the HMI 180 is sited on the front face of the high capacity oven 110 above and separate from the oven door 160. In another embodiment of the inventive concepts disclosed herein, the HMI 180 may be sited on the oven door allowing for a decreased space between the top of the insulation 114 and the oven external case 112.

To increase efficiency of component placement, the high capacity oven 110 may be configured with the OCU 120 and cooling fan 140 proximal with the oven external case handle 118. In an additional configuration, the high capacity oven 110 may be configured with the OCU 120 and cooling fan 140 proximal with the oven fan motor 128. In this manner, each separate placement of the components within the oven external case 112 may offer an additional fraction of vertical space available to increase the aggregate vertical dimension of the oven internal cavity 130 and thus increase a number of evenly spaced food trays for efficient cooking.

In one embodiment of the inventive concepts disclosed herein, the high capacity oven 110 maintains a sufficient vertical dimension of the insulation to comply with an aviation compliance standard. This standard may be temperature related (functional) or an actual dimension of the insulation (directive).

FIG. 2 Front View

Figure 2:
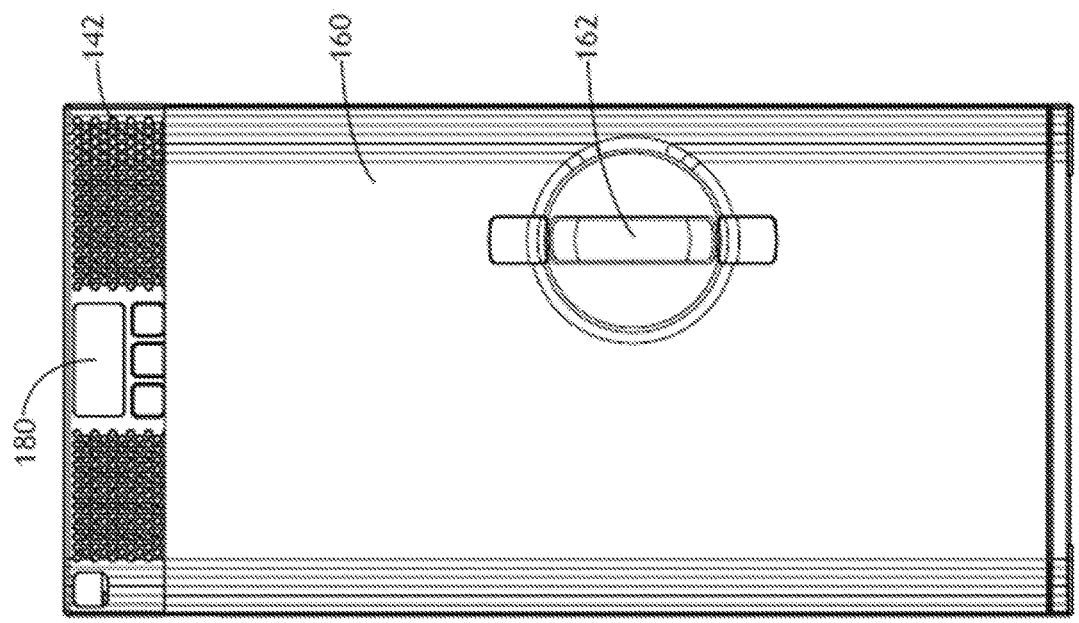
FIG. 2 is a diagram of a front view of a high capacity oven in accordance with an embodiment of the inventive concepts disclosed herein.

Referring now to FIG. 2, a diagram of a front view of a high capacity oven in accordance with an embodiment of the inventive concepts disclosed herein is shown. A front view 200 of the high capacity oven 110 may indicate the oven door 160 and associated oven door handle 162, the cooling air inlet 142 sited on either side of the HMI 180. Sufficient cooling air may be drawn into the oven external case cavity 126 to enable cooling around the oven insulation 114.

In one embodiment of the inventive concepts disclosed herein, the HMI may be sited on the front face of the oven door 160 allowing freedom of placement of the HMI 180. For example, the HMI 180 may be sited lower on the front face of the oven door 160 to aid in access for a user. The high capacity oven 110 may then offer a Certificate Holder flexibility in oven placement to possible locate the high capacity oven 110 in a higher location in an aircraft galley.

With HMI 180 placement on the oven door 160, the high capacity oven 110 may offer more freedom of arrangement to further increase a size of the oven internal cavity 130.

Figure 3:
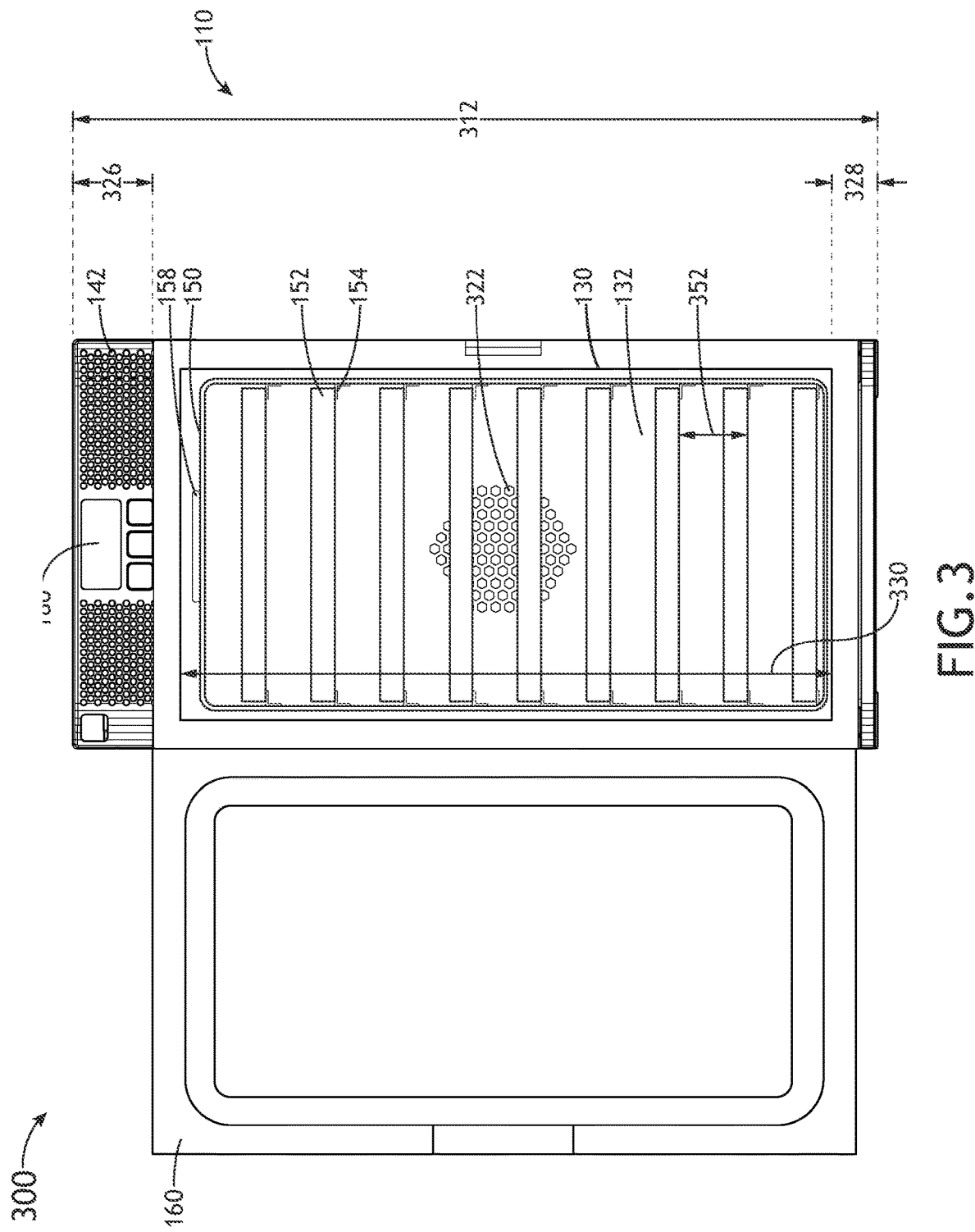
FIG. 3 is a diagram of a front view of a high capacity oven with open door exemplary of an embodiment of the inventive concepts disclosed herein.

FIG. 3 Front Door Open

Referring now to FIG. 3, a diagram of a front view of a high capacity oven with open door exemplary of an embodiment of the inventive concepts disclosed herein is shown. The front view 300 may offer insight to each of the vertical dimensions discussed herein.

An oven external case vertical dimension 312 may be that ARINC 810 compliant standard of approximately 563 mm.

Between the oven external case 112 and the upper insulation, an external case upper cavity vertical dimension 326 may be a measurement of the space above the oven internal cavity 130. Within the oven internal cavity 110 the oven internal vertical dimension 330 may define the vertical dimension available to the high capacity meal carrier 150. Within the high capacity meal carrier 150, meal tray spacing 352 may offer a vertical dimension of the separation between each meal tray bracket 154 and thus, each meal tray 152. An external case lower cavity vertical dimension 328 may offer a definition of the space between the oven external case 112 and the oven insulation 114 on a bottom surface of the oven internal cavity 130.

In one embodiment of the inventive concepts disclosed herein, the oven internal cavity vertical dimension approximates 460 mm to accommodate nine vertically spaced meal trays 152 within the high capacity meal carrier 150. Various cooking factors may influence how efficiently and effectively an oven may cook a plurality of trays of meals. Factors may include oven internal cavity 130 temperature, meal tray 152 spacing, oven fan 122 speed, oven humidity level, a vertical dimension of each meal within each meal tray 152, aircraft cabin altitude, etc. Each of these factors may be modified by the high capacity oven 110 to ensure adequate performance of cooking.

As the external case upper cavity vertical dimension 326 and the external case lower cavity vertical dimension 328 may each or separately be reduced, the oven internal cavity vertical dimension 330 may be increased to accommodate a greater number (e.g., nine or more) of vertically spaced meal trays 152. In addition, the meal tray spacing 352 may be reduced to provide space for additional numbers of vertically spaced meal trays 152.

In one embodiment of the inventive concepts disclosed herein, the vertical dimension of the upper cavity of the oven external case 326 may approximate 55 mm and a vertical dimension of an oven external case lower cavity 328 approximates 14 mm.

In one embodiment of the inventive concepts disclosed herein, the high capacity oven 110 may be in compliance not only with size requirements but also with each additional ARINC 810 size 2 standard including: Weight, Physical Attachment (Type, Location, Restraint Capability), Electrical (Type, Load, Connection, Location), Data (Type, Load, Connection, Location), Grounding and Bonding (Concept of Bonding Definition, Type, Resistance, Connection, Location), Potable Water (Type, Flow Rate, Pressure, Connection, Location), Drain (Type, Flow Rate, Pressure, Connection, Location), Clearance (Dimensions), External Temperature Effects (Heat Shielding), and Miscellaneous Closeouts.

Figure 4:
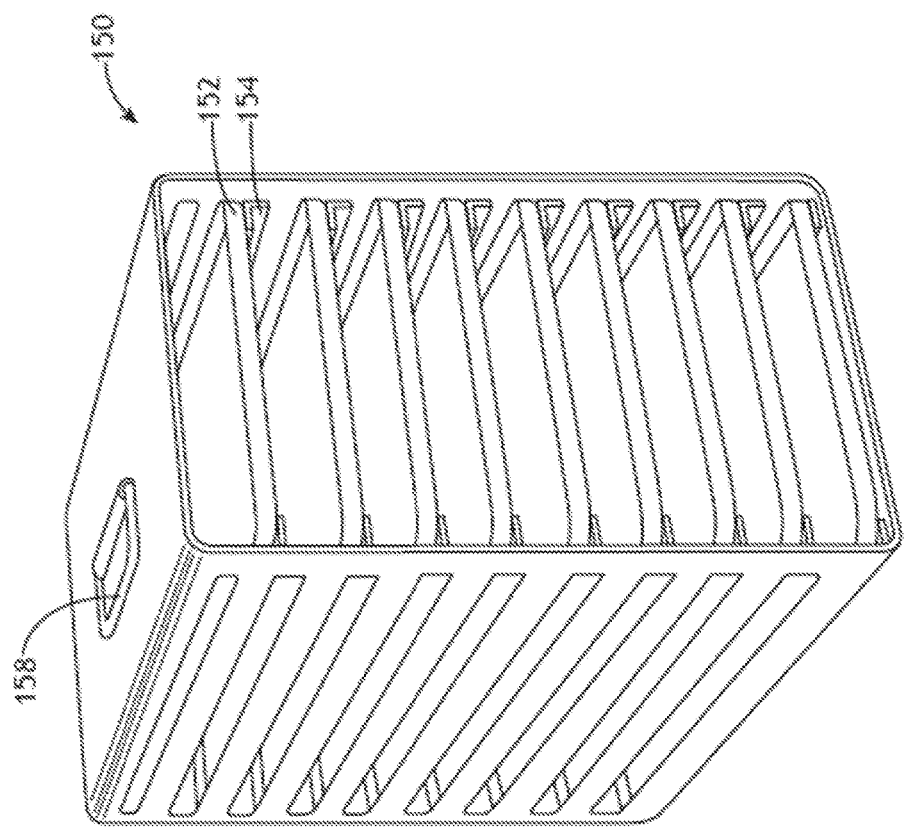
FIG. 4 is a diagram of a high capacity meal carrier exemplary of one embodiment of the inventive concepts disclosed herein.

FIG. 4 Meal Carrier

Referring now to FIG. 4, a diagram of a high capacity meal carrier exemplary of one embodiment of the inventive concepts disclosed herein is shown. The front view 400 of the high capacity meal carrier 150 may indicate a vertical capacity of at least nine meal trays 152.

It is contemplated herein, the high capacity oven 110 may be further modified to receive a high capacity meal carrier 150 holding and efficiently cooking nine or greater meal trays 152. Efficiency in arrangement of internal components discussed above may allow the oven internal cavity 130 to be increased in vertical dimension greater than 460 mm. Cooling airflow modification, coupled with cooling fan 140 placement, HMI 180 placement, and OCU 120 placement may provide the additional area for the oven internal cavity to increase in vertical dimension to approximately 530 mm.

FIG. 5 Method

Figure 5:
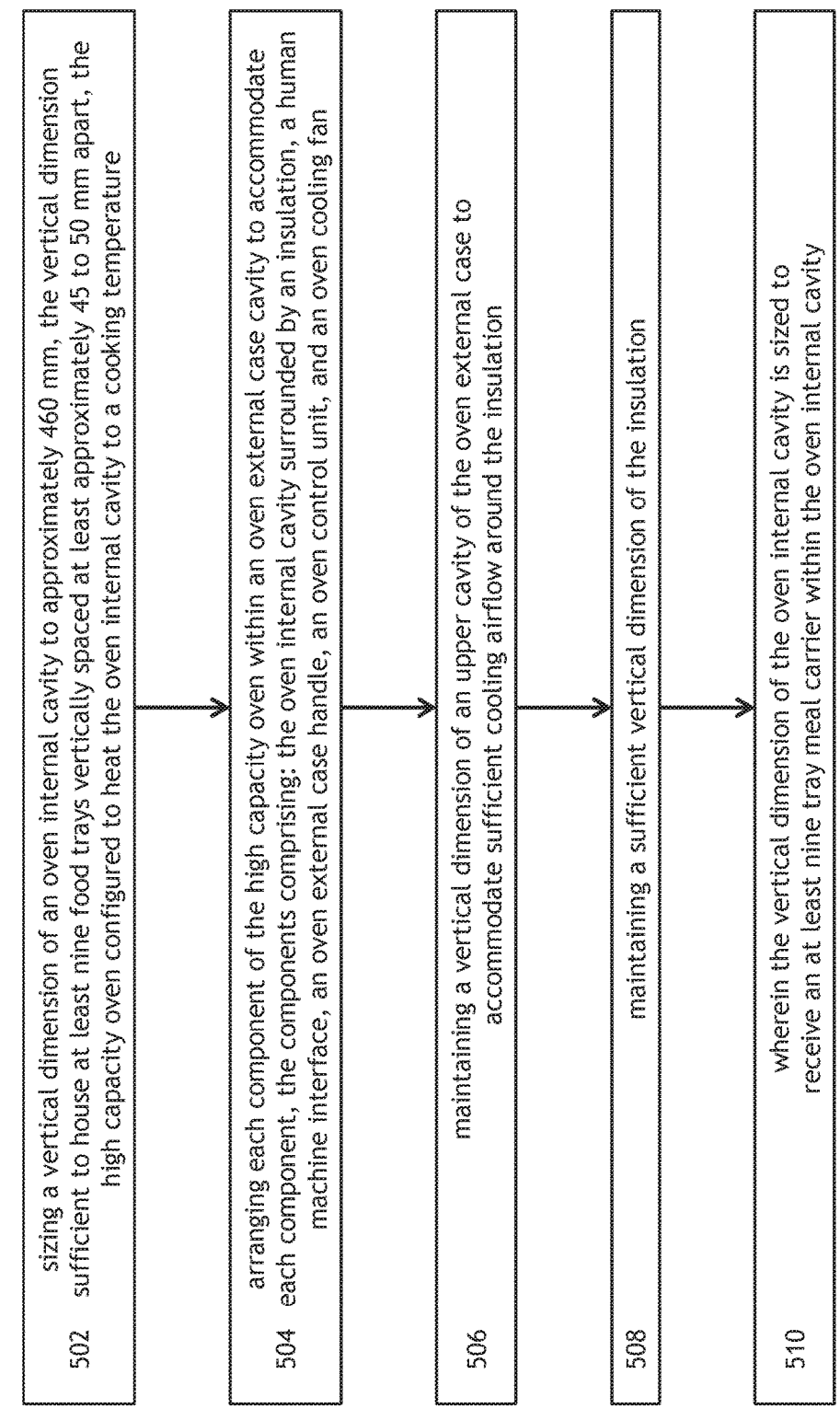
FIG. 5 is a flowchart of a method for vertically configuring a high capacity oven in accordance with one embodiment of the inventive concepts disclosed herein.

Referring now to FIG. 5, a flowchart of a method for vertically configuring a high capacity oven in accordance with one embodiment of the inventive concepts disclosed herein is shown. The method 500 may include a step 502 of sizing a vertical dimension of an oven internal cavity to approximately 460 mm, the vertical dimension sufficient to house at least nine food trays vertically spaced at least approximately 45 to 50 mm apart, the high capacity oven configured to heat the oven internal cavity to a cooking temperature. The method 500 may continue with a step 504, of arranging each component of the high capacity oven within an oven external case cavity to accommodate each component, the components comprising: the oven internal cavity surrounded by an insulation, a human machine interface, an oven external case handle, an oven control unit, and an oven cooling fan with an associated oven cooling fan motor.

The method 500 may include, at a step 506, with maintaining a vertical dimension of an upper cavity of the oven external case to accommodate sufficient cooling airflow around the insulation. The method may continue at a step 508, with maintaining a sufficient vertical dimension of the insulation. At a step 510, the method 500 may include wherein the vertical dimension of the oven internal cavity is sized to receive an at least nine-tray meal carrier within the oven internal cavity.

CONCLUSION

As will be appreciated from the above, a high capacity oven according to embodiments of the inventive concepts disclosed herein may have enable a certificate holder an opportunity to increase efficiency to cook more meals at once.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. An apparatus for heating food, comprising:
a high capacity oven having an oven external case configured to insert within an aircraft galley, the oven external case maintaining a standard outside vertical dimension in compliance with an aviation standard size of aircraft oven having a maximum vertical outside dimension of approximately 563 mm and a maximum external lateral dimension of approximately 287 mm;

the high capacity oven configured for a heating of an oven internal cavity to a cooking temperature, the oven internal cavity maintaining an oven internal cavity vertical dimension of approximately 460 mm to receive a high capacity meal carrier, the high capacity meal carrier configured to receive at least nine meal trays vertically spaced at a vertical spacing dimension sufficient for cooking;

the high capacity oven having vertically arranged components within the oven external case and associated with the heating, each of the vertically arranged components is arranged within the standard outside vertical dimension, the high capacity oven powered by a standard sized electrical connection compatibly located with a standard sized galley inserts (GAIN) oven opening and GAIN electrical source;

wherein the high capacity oven is configured for the heating while inserted within the aircraft galley and while connected to the GAIN electrical source while maintaining a safe temperature within the oven external case.

2. The apparatus for heating food of claim 1, wherein the aviation standard size of aircraft oven maintains an external longitudinal dimension of approximately 570 mm.

3. The apparatus for heating food of claim 1, wherein the cooking temperature is at least approximately 170 degrees C. and the safe temperature is approximately 71 degrees C.

4. The apparatus for heating food of claim 1, wherein vertical spacing dimension sufficient for cooking is approximately 48 mm.

5. The apparatus for heating food of claim 1, wherein the vertically arranged components comprise the oven internal cavity surrounded by an insulation and at least one of:
   1) a human machine interface (HMI), the human machine interface accessible by a user,
   2) an oven control unit (OCU),
   3) an oven external case handle, and
   4) at least one cooling fan.

6. The apparatus for heating food of claim 5, wherein the HMI is associated with at least one external surface of an oven door.

7. The apparatus for heating food of claim 5, wherein the OCU and cooling fan are proximal with one of: the oven external case handle or an oven fan motor.

* * * * *